June 2, 1931.  A. H. BOTTORFF  1,807,891
COMBINED COLLECTOR AND SEPARATOR FOR FEED MILLS
Filed May 7, 1929    3 Sheets-Sheet 1

Inventor

Albert H. Bottorff

By Clarence A. O'Brien
Attorney

June 2, 1931. A. H. BOTTORFF 1,807,891
COMBINED COLLECTOR AND SEPARATOR FOR FEED MILLS
Filed May 7, 1929 3 Sheets-Sheet 2

Inventor
Albert H. Bottorff.

By Clarence A. O'Brien
Attorney

June 2, 1931.  A. H. BOTTORFF  1,807,891
COMBINED COLLECTOR AND SEPARATOR FOR FEED MILLS
Filed May 7, 1929  3 Sheets-Sheet 3

Inventor

Albert H. Bottorff

By Clarence A. O'Brien
Attorney

Patented June 2, 1931

1,807,891

UNITED STATES PATENT OFFICE

ALBERT H. BOTTORFF, OF ST. JOSEPH, MISSOURI

COMBINED COLLECTOR AND SEPARATOR FOR FEED MILLS

Application filed May 7, 1929. Serial No. 361,159.

The present invention relates to an improved combination dust collector and separator for feed mills, and has more particular reference to a characteristically designed automatically operable device which is usable in conjunction with conventional feed mill blower pipes and which serves to separate and grade meal from corn chops.

Before introducing the objects and advantages, I first wish to call attention to the fact, that this application is closely allied to a copending application, bearing the same title, and filed by me under date of March 6, 1929, and designated as Serial Number 344,754.

Generically speaking, the present device in this application, as well as the device in the copending application, relies for novelty upon a simplified structure for accomplishing the dual purpose of collecting, separating and grading feeds, and the device is made for cooperation with ordinary hammer feed mills for any type of a mill, utilizing a blower pipe.

In order to observe the principal distinctions between the original structure of the prior filed application, it may be conveniently and briefly stated here, that said device comprises a structure characterized by the combination of a collector including a casing having an annulus provided with a force speed inlet, which is connected with the blower pipe of the mill, and this casing is of conical configuration, and provides a housing for a correspondingly shaped separating screen, there being a multi-way tracking device associated with these parts.

In the improved arrangement, however, I provide a plurality of complemental separating screens formed into a novel assembly or unit, which is removally placed in the collector casing and which cooperates with said casing in producing a plurality of distinct grades of feeds.

There are many other refinements and distinguishable features found in the improved arrangement, the same being particularly novel in that it includes separably connected parts to facilitate transportation, assembly, cleaning, and other purposes. In addition, the screen is so constructed as to more intimately and directly cooperate with the incoming grain-laden air, whereby to set up a forcable centrifugal action causing the particles to cling to and be effectively driven thru the wire mesh of the screens.

Another feature of construction consists in the utilization of a removable cover carrying a vent, the inner end portion of which depends into the conical portion of the separating screen, said vent being provided with a damper, whereby to permit the action of air to be regulated according to existing conditions.

A further feature, is predicated upon the utilization of a portable stand permitting the structure to be readily installed, particularly when used in connection with relatively small mills by farmers, of limited income.

Then too, an important feature is found in the utilization of a reducing nipple which is associated with the inner screen and cooperable with the damper equipped vent, whereby to provide more effective results.

Other features and advantages will become more readily apparent from the following description and drawings.

In the drawings:—

Figure 1:
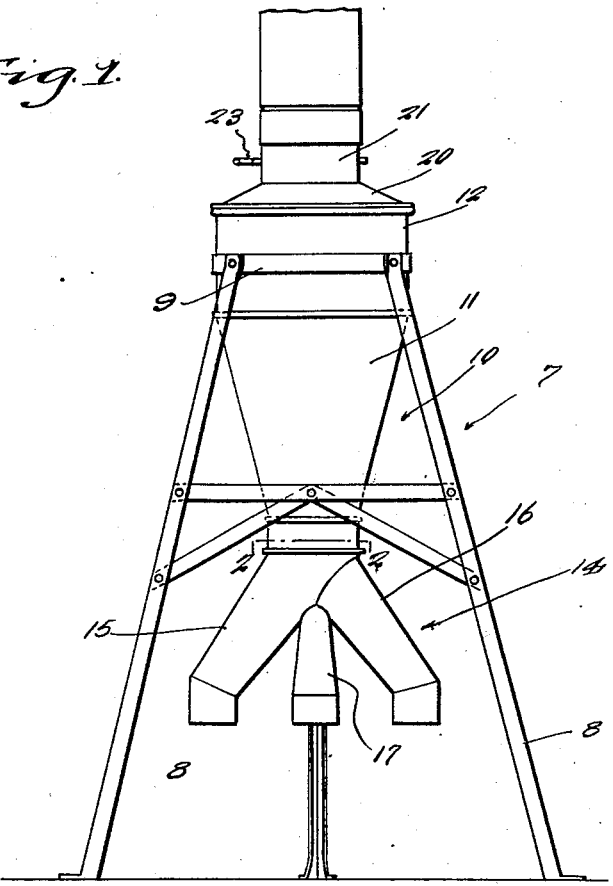
Fig. 1 is a side elevational view of the complete structure mounted on a portable stand.
Figure 2:
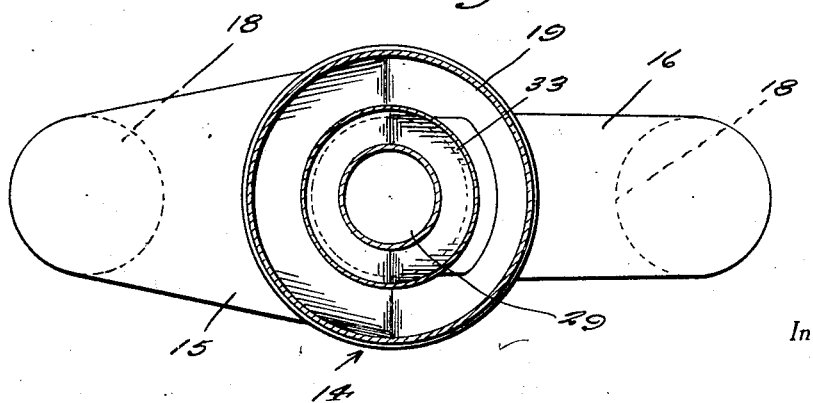
Fig. 2 is an enlarged horizontal cross sectional view taken approximately upon the plane of the line 2—2 of Fig. 1.

Referring first to Fig. 1, it will be seen that the reference character 7 designates a portable stand which includes appropriate supporting legs 8, having a ring-like supporting band or head 9 at the top on which the complete collector and separator, generally designated by the reference character 10, is mounted. This stand is not altogther necessary except where the device is comparatively small and used in connection with correspondingly small mills. Therefore, the stand may be of any appropriate construction. It is here shown as of collapsible or foldable design.

Figure 3:
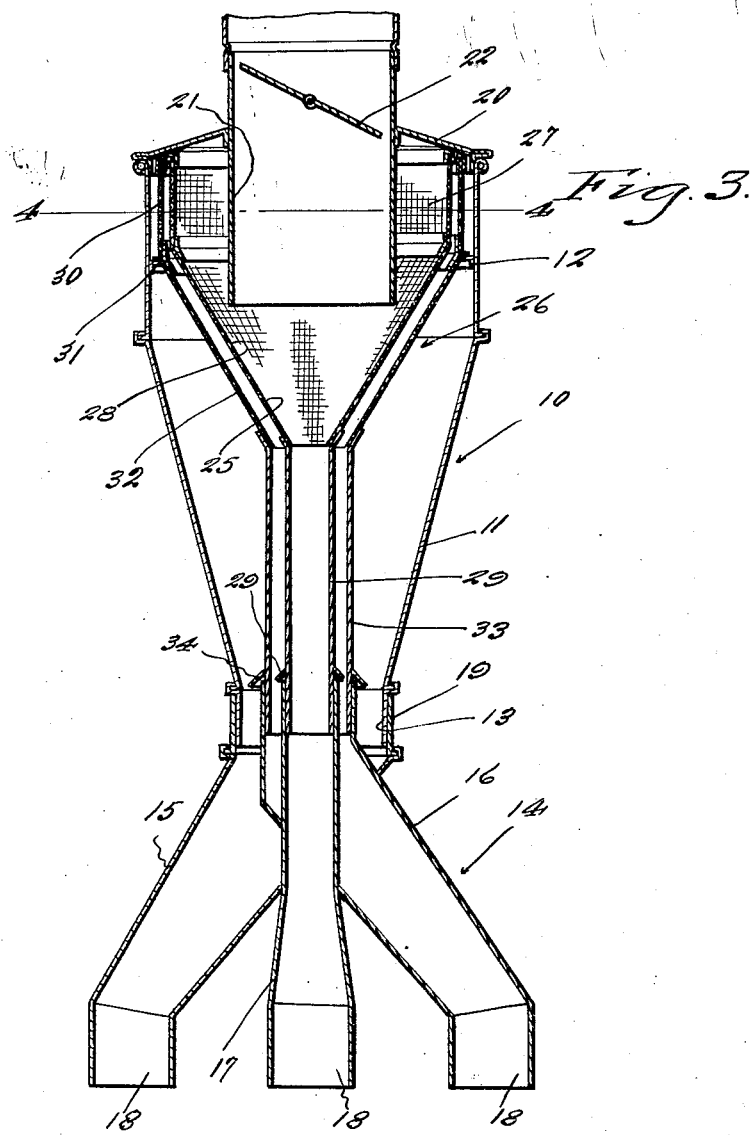
Fig. 3 is a central vertical sectional view through the complete collector and separator assembled for operation.

Directing attention now to Fig. 3, it will be seen that the collector comprises a truncated conical casing 11 having an annulus 12 at its top and having a correspondingly shaped neck 13 at its bottom. A discharge spout unit 14 is telescopically and removably connected with the neck 13. This unit 14 embodies outwardly diverging branches 15 and 16 and an intermediate central branch 17. These are in turn provided at their lower ends with suitably shaped discharge extremities 18, with which individual bags (not shown) may be connected.

Any suitable forms of depositing receptacles may however, be attached to these branches. The branches are so formed as to provide individual passage of the separated or graded feed. The shape and relationship is clearly shown in Fig. 3. For instance, the upper end of the branch 15 carries a ring-like collar 19 which fits over the neck 14. The upper end of the branch 16 is centralized and the corresponding end of the branch 17 extends through and arranged concentrically therein in spaced relation.

Figure 4:
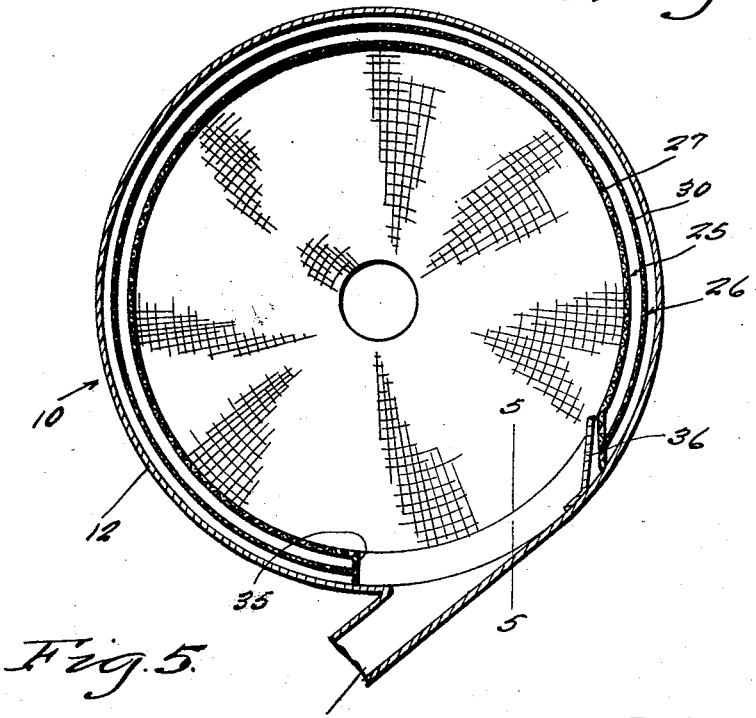
Fig. 4 is an enlarged horizontal section taken approximately upon the plane of the line 4—4, of Fig. 3.
Figure 5:
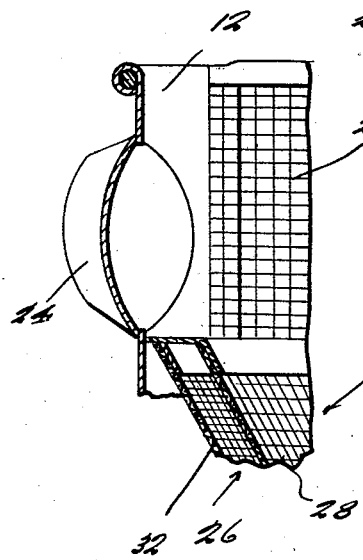
Fig. 5 is a sectional view on the line 5—5 of Fig. 4.

The reference character 20 designates a removable cover carrying a vent 21, the inner end portion of which projects into the annulus 12. A damper 22 having suitable operating cranks or rods 23 is mounted in this vent to regulate the action of the incoming grain-laden air. As seen in Fig. 4, the air and grain enter the casing by way of the inlet 24. The inlet is suitably formed to permit it to be connected with the ordinary blower pipe (not shown), of the feed mill. This blower pipe under ordinary conditions, elevates the grain to a suitable point of deposit.

In accordance with the present invention, I provide a plurality of grading and separating screens. I have here shown a pair of screens, one being generally designated by the reference character 25, and the other one by the reference character 26. The inner screen includes an annular mouth 27 and a conical deflector 28. This deflector is connected to the upper end of a pipe 29, which may be designated as a delivery pipe, and whose lower end is telescopically fitted into the upper end of the centralized branch 17, there being a cap flange 29' at the juncture of these parts 29 and 17. The screen 25 is fixedly connected with the screen 26. The screen 26 also includes an annular mouth 30 carrying a supporting flange removably resting on a ledge 31 and carrying further a deflector cone 32 which is connected to the upper end of a delivery pipe 33. This delivery pipe telescopes down into the upper end of the branch 16. Here again I provide a cap flange 34.

Figure 6:
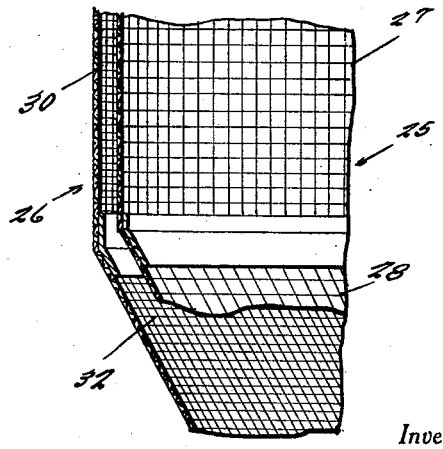
Fig. 6 is a fragmentary section showing the relationship of the complemental screen.

The parts 27 and 30 are open on one side to provide an entrance opening as at 35 and this communicates with the inlet 24 as seen in Fig. 4. On the opposite end of the inlet is a baffle plate 36. It will be observed from Fig. 6, that the mesh of the inner screen 25 is comparatively coarse with respect to the mesh of the complemental outer screen 26. Thus the coarser materials are separated by this screen 25 and pass down through the discharge or delivery pipes 29.

The particles of intermediate size blown through this inner screen are acted upon by the finer mesh of the outer screen 26 and pass down through the space between the two screens and down through the delivery pipe 33. The remainder of the material passes through the screen 26 and accumulates in the casing 11, and passes down from this casing through the neck 13 and the discharge branch 15. Thus the coarse grain is discharged through the spout or branch 17, the intermediate grain through the spout 16, and the fine grain through the spout 15.

It is obvious that the unit 14 is separable from the screen units, and are bodily removable from the casing when the cover 20 is removed. Another feature to be mentioned, is the pending portion of the vent which is so disposed as to properly cooperate with the conical portion of the separating screen. Also, I wish to emphasize the utility of the damper plate 22 which can be regulated under certain conditions to afford definite and dependable action of the driving force of the incoming air.

Figure 7:
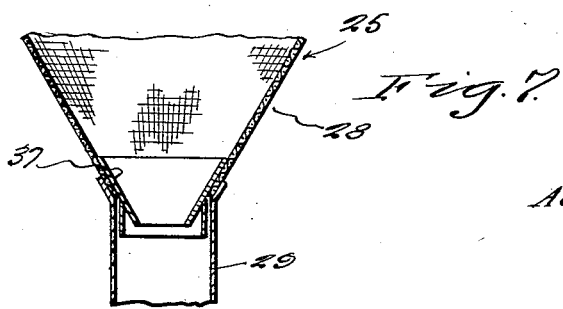
Fig. 7 is a detail sectional view showing the reducing nipple in place.

By closing this damper and using a reducing nipple 37. As shown in Fig. 7, the energy of the air can be retained for a greater period of time to be more forceful and active. In other words, these parts 22 and 37 function somewhat as valves to confine the air force within the screen for a greater period of time to insure more efficient results.

It is thought that by considering my copending application and the description and drawings of the present application, a clear understanding of the contribution to the art will be clearly understood by persons skilled in the art to which the invention relates. Therefore, a more lengthy description is regarded unnecessary.

It is to be understood however, that changes in shape, size, and materials, such as fall within the meaning of the adjoined claim, may be resorted to in actual practice if desired.

Having thus described my invention, what I claim as new is:—

A combined collector and separator for feed mills comprising a truncated conical casing for the reception of feed having annular upper and lower portions, the annular upper portion being provided with an inlet opening, a conduit disposed tangentially to the upper portion and communicating therewith through the opening for discharging feed thereinto, a pair of spaced, truncated feed separating screens disposed concentrically in the casing and having cylindrical upper portions disposed in the annular upper portion of the casing, the upper portions of the screens having openings therein adjacent the inlet opening for the passage of the feed, a ledge mounted in the annular portion of the casing beneath the inlet opening and extending therefrom over adjacent portions of the upper ends of the truncated portions of the screens, the innermost screen having the portions of the cylindrical portion thereof which are adjacent the sides of the inlet opening extending outwardly past the adjacent edges of the outermost screen to the casing, and a deflector disposed tangentially in the casing above the ledge and in alignment with the conduit for directing the feed inwardly relative to the periphery of the casing.

In testimony whereof I affix my signature.

ALBERT H. BOTTORFF.